US007158385B1

(12) United States Patent
Wang

(10) Patent No.: US 7,158,385 B1
(45) Date of Patent: Jan. 2, 2007

(54) SECURING DEVICE FOR SECURING/SEPARATING TWO ADJACENT SIDE BOARDS OF A COMPUTER MAIN FRAME

(75) Inventor: Chia-Chin Wang, Taipei (TW)

(73) Assignee: San Hawk Technic Co., Ltd., Taipei (TW)

( * ) Notice: Subject to any disclaimer, the term of this patent is extended or adjusted under 35 U.S.C. 154(b) by 0 days.

(21) Appl. No.: 11/179,212

(22) Filed: Jul. 12, 2005

(51) Int. Cl.
*H05K 5/00* (2006.01)
*H05K 5/04* (2006.01)
*H05K 5/06* (2006.01)

(52) U.S. Cl. ...................... 361/759; 361/754; 361/798; 361/801

(58) Field of Classification Search ........ 361/756–759, 361/801–802, 796–798; 211/41.17
See application file for complete search history.

(56) References Cited

U.S. PATENT DOCUMENTS 5,293,303 A * 3/1994 Fletcher et al. ............. 361/798
5,398,167 A * 3/1995 Joist et al. .................. 361/801
5,428,507 A * 6/1995 Chatel et al. ............... 361/798
6,185,106 B1 * 2/2001 Mueller ...................... 361/798
6,373,713 B1 * 4/2002 Jensen et al. ............... 361/759

* cited by examiner

*Primary Examiner*—Tuan Dinh
(74) *Attorney, Agent, or Firm*—Cooper & Dunham LLP; William E. Pelton, Esq.

(57) ABSTRACT

A securing device includes a central rod extending from the driving press to be movably mounted on a top board of the computer main frame and a base having an engaging plate movably attached to the base via a first spring which is sandwiched between the base and the engaging plate and a lateral rod securely extending away from the engaging plate to selectively engage with a free end of the central rod. When the central rod is longitudinally moved, the longitudinal movement of the central rod drives the lateral rod to move laterally and thus a hook which is formed on a side face of the engaging plate for extending through the first side board and the second side board to secure engagement between the first side board and the second side board is away from the first side board and the second side board and the second side board is free from engagement with the first side board.

10 Claims, 5 Drawing Sheets

SECURING DEVICE FOR SECURING/SEPARATING TWO ADJACENT SIDE BOARDS OF A COMPUTER MAIN FRAME

BACKGROUND OF THE INVENTION

1. Field of the Invention

The present invention relates to a securing device, and more particularly to a securing device for securing and separating two adjacent side boards of a computer main frame.

2. Description of Related Art

A computer main frame has at least two side boards detachably connected to a front board and a top board via retainers such as screws, bolts, etc. When removing the side boards is required to have access to the interior of the computer main frame so as to proceed maintenance, special tools such as a screw driver is necessary to unscrew the screws. However, most of the time there is no suitable tool to separate two adjacent side boards so that either the screw is damaged due to the employment of improper tool or the engagement between the two adjacent side boards is loosened as a result of force-open the two adjacent side boards.

To overcome the shortcomings, the present invention tends to provide an improved securing device to mitigate the aforementioned problems.

SUMMARY OF THE INVENTION

The primary objective of the present invention is to provide a securing device to easily secure/separate two adjacent side boards of a computer main frame.

In one aspect of the present invention, the securing device includes a driving press and a driven rod selectively engaged with the driving press. The driving press has a free end provided with a first inclined face. The driven rod has a free end provided with a second inclined face complimentary to and engaged with the first inclined face.

In yet another aspect of the present invention, the driving press is longitudinally movable relative to the two side boards and the driven rod is laterally movable relative to the two side boards such that the longitudinal movement of the driving press is able to drive the driven rod to move laterally.

A further aspect of the present invention is that the driven rod is securely fixed to an engaging plate having a hook formed on a side face of the engaging plate for securing an adjacent side board such that when the driven rod is moved by the driving press, the hook is moved accordingly and thus engagement between the two adjacent side boards is released.

Other objects, advantages and novel features of the invention will become more apparent from the following detailed description when taken in conjunction with the accompanying drawings.

DETAILED DESCRIPTION OF THE PREFERRED EMBODIMENT

Figure 1:
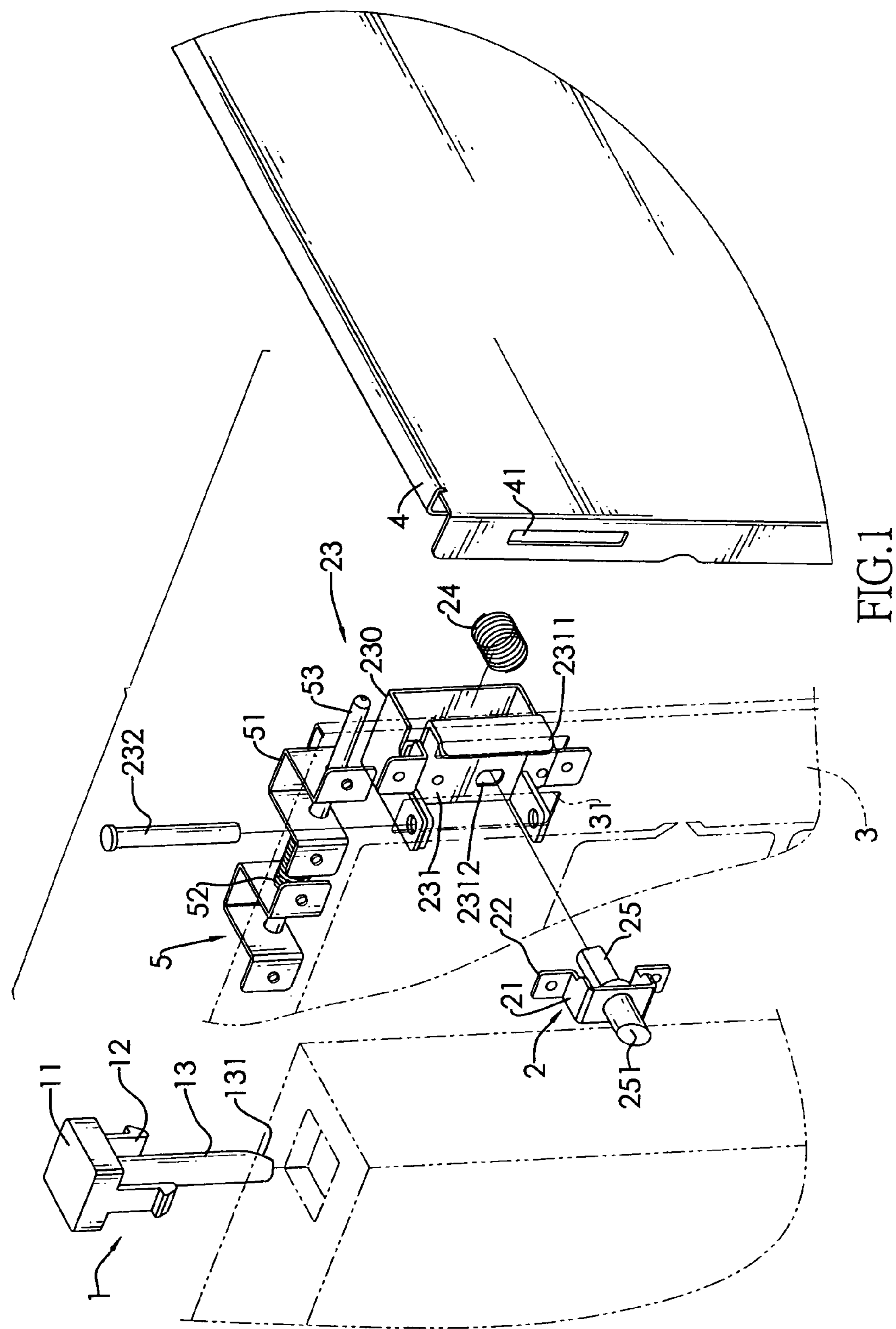
FIG. 1 is an exploded perspective view of the securing device of the present invention.

With reference to FIG. 1, it is noted that the securing device in accordance with the present invention includes a driving press (1), and a driven rod (2). The driving press (1) has a head (11), two engaging arms (12) opposite to each other and respectively extending from a bottom side face of the head (11) and a central rod (13) extending between the two engaging arms (12) from the bottom side face of the head (11) and having a first inclined face (131) formed on a free end of the central rod (13). The driving press (1) is movably mounted on a top board of a computer main frame and a top face of the head (11) is flush with a top face of the top board so that the driving press (1) is concealed inside the top board of the computer main frame.

The driven rod (2) is securely attached to an inner side face of a side board of the computer main frame. The driven rod (2) is provided with a base (21), two engaging extensions (22) respectively formed and extending from a side face of the base (21) to securely engage with the inner side face of the side board, an engaging plate (23) firmly engaged with the base (21) via appropriate connection methods known in the art, and having a fixed plate (230) securely connected to the first side board, a moving plate (231) pivotally connected to the fixed plate (230) via a pin (232) and provided with a hook (2311) extending from a face of the engaging plate (231) such that the moving plate (231) is able to pivotally move relative to the fixed plate (230), a spring (24) sandwiched between the moving plate (231) and the fixed plate (230) so that the spring (24) is able to provide a recovery force to the moving plate (231) after the moving plate (231) is moved, and a lateral rod (25) integrally formed with the base (21) and having a first end extending through a through hole (2312) defined in the moving plate (231) to have the spring (24) mounted therearound and a second end provided with a second inclined face (251) complementary to the first inclined face (131) of the central rod (13). It is noted that after the extension of the lateral rod (25) through the through hole (2312) of the moving plate (231), the distal end of the lateral rod (25) is not in engagement with a face of the fixed plate (230). That is, there exists a space for the lateral rod (25) to move between the moving plate (231) and the fixed plate (230).

Figure 2:
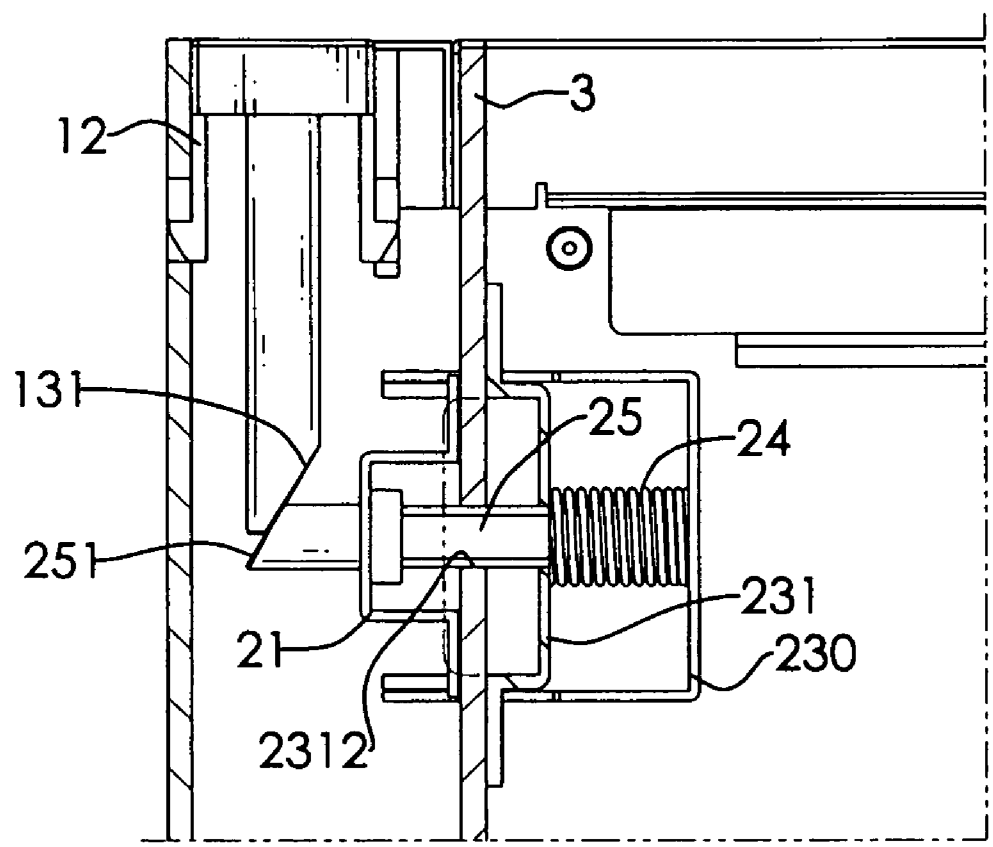
FIG. 2 is a schematic side plan view showing the engagement between the driving press and the driven rod.

From the depiction of the accompanied drawing of FIG. 2, it is noted that when the driving press (1) is assembled with the top board of the computer main frame, driving press (1) is inserted through a hole (not numbered) of the top board of the computer main frame and the two engaging arms (12) engage with a bottom face of the top board to prevent the driving press (1) from escaping out of the hole of the top board.

The driven rod (2) is securely and firmly connected to the inner side face of a first side board via the two engaging extensions (22) with the second inclined face (251) engaged with the first inclined face (131) of the central rod (13). It is noted that the first side board (3) is provided with a first slit (31) and a second side board (4) is provided with a second slit (41) communicating and aligned with the first slit (31).

Therefore, when the first side board (3) is to be connected to the second side board (4), a peripheral edge of the first side board (3) is received in a cutout (not numbered) of the second side board (4) to align the first slit (31) with the second slit (41). Then the hook (2311) is inserted into the aligned first slit (31) and the second slit (41) to secure the second side board (4) to the first side board (3).

Figure 3:
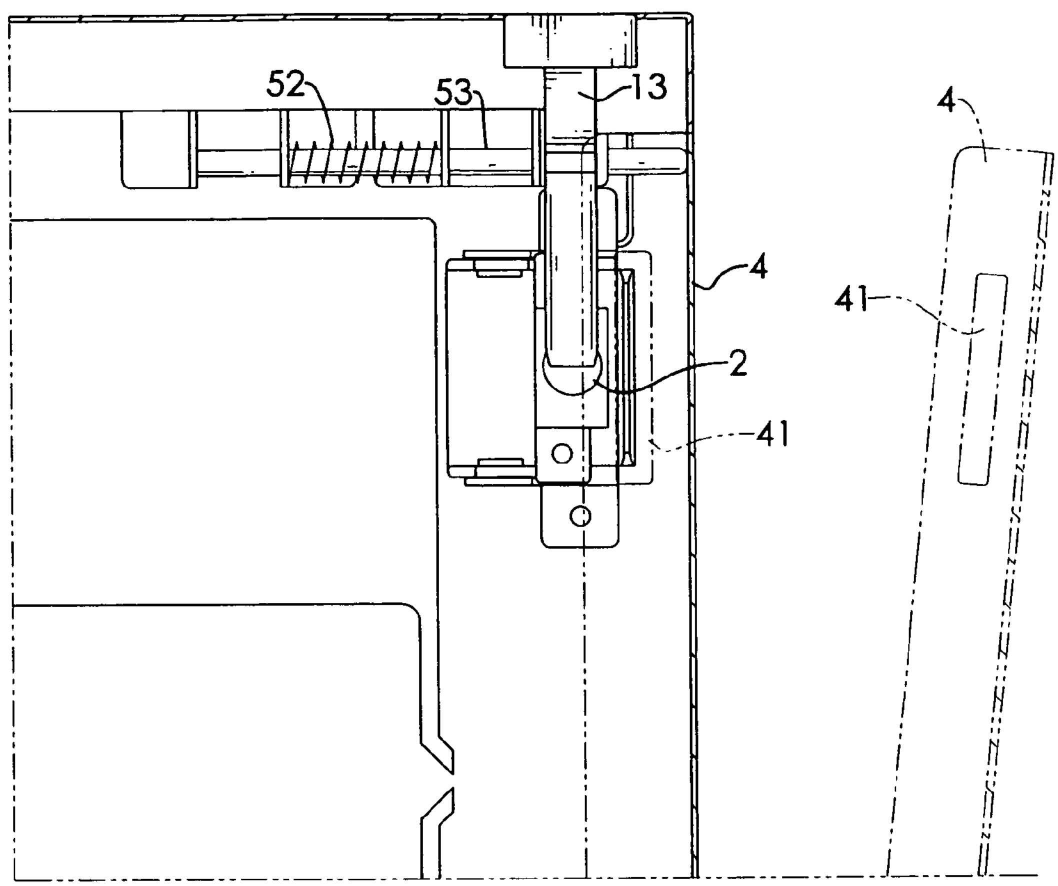
FIG. 3 is a schematic side plan view showing that the driven rod is forced to retrograde such that two adjacent side boards are separated.
Figure 4:
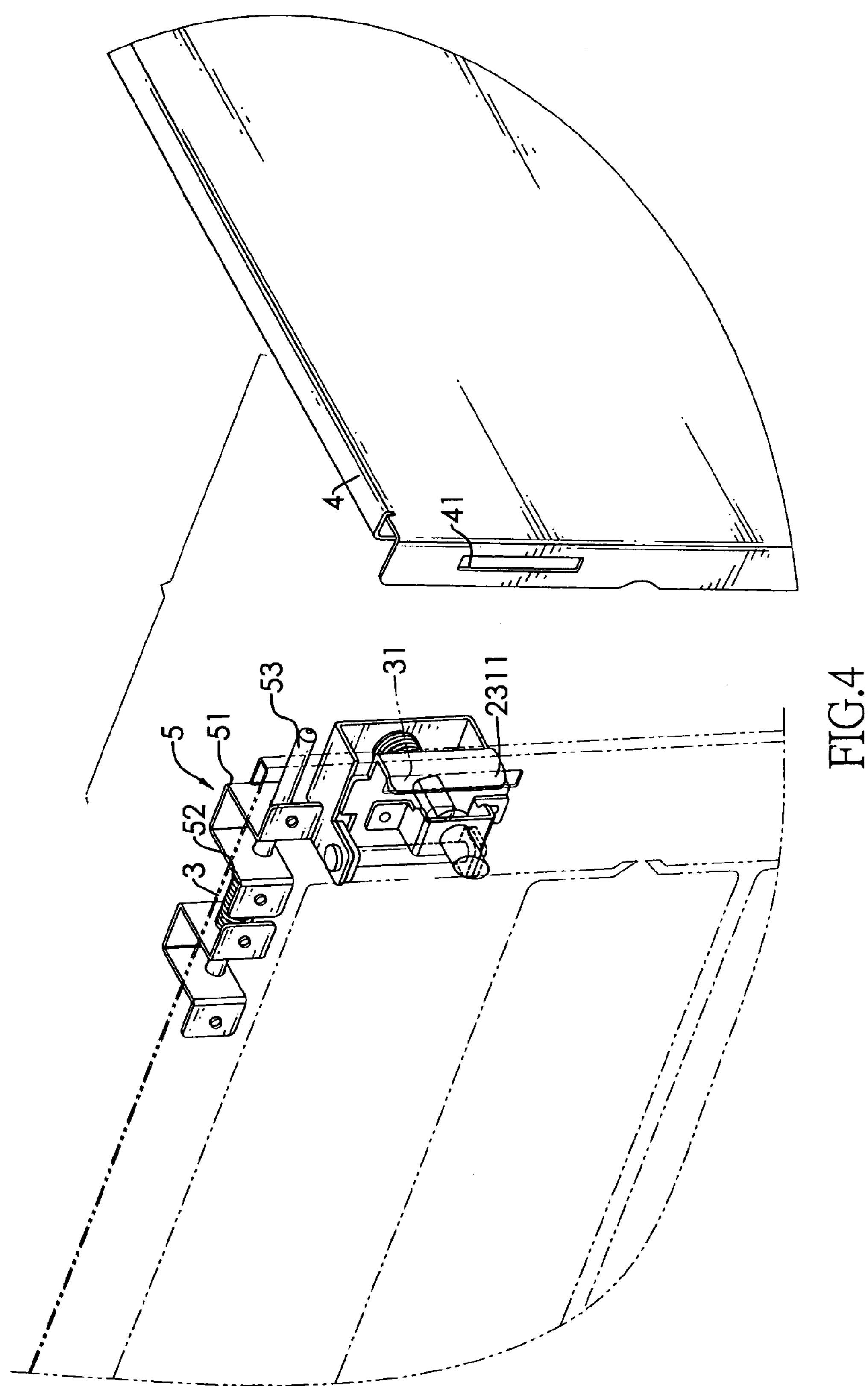
FIG. 4 is a perspective view showing an addition of an auxiliary facilitating device to help separate the two adjacent side boards.
Figure 5:
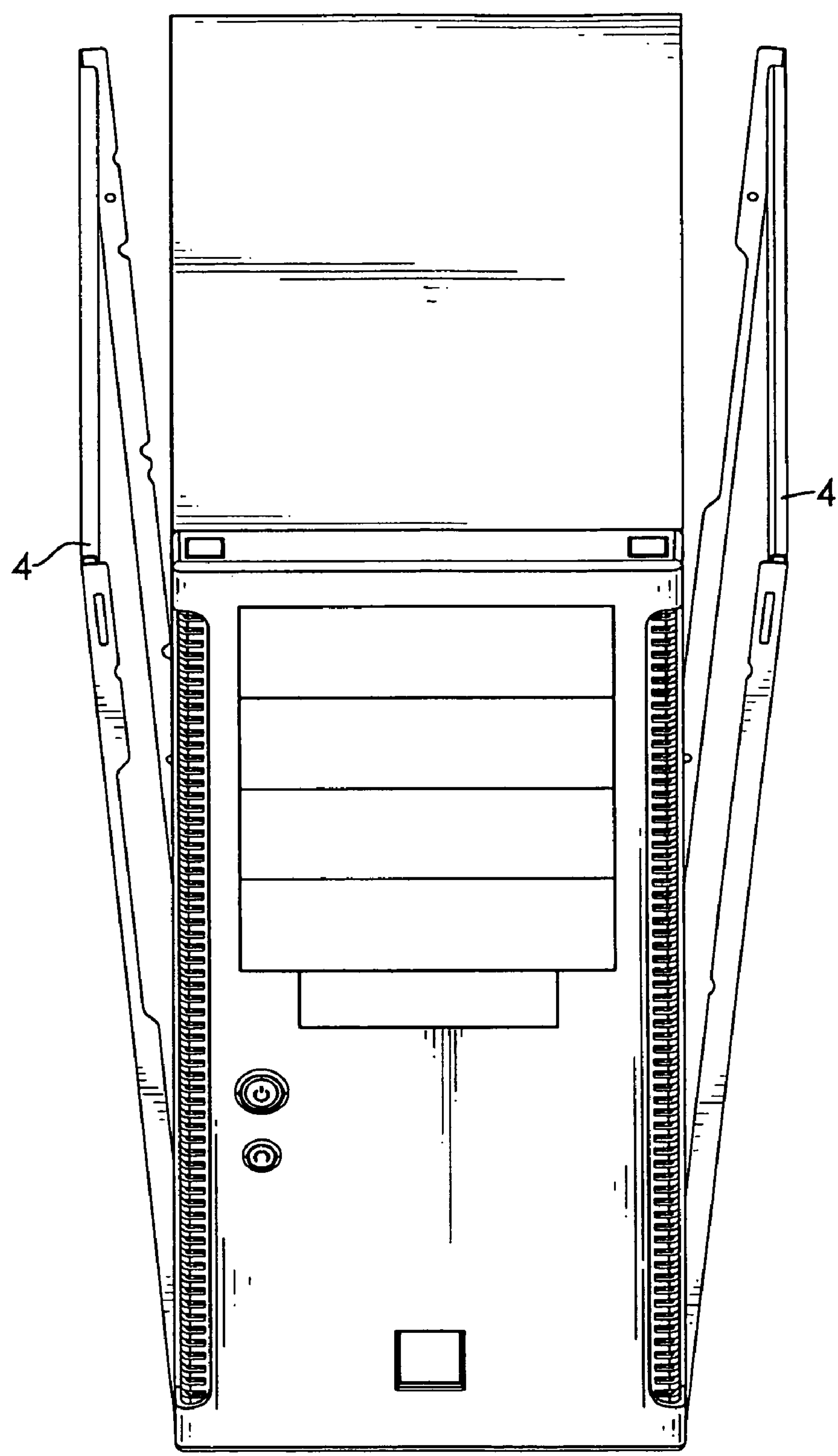
FIG. 5 is a schematic perspective view showing that two side boards are separated.

With reference to FIG. 3 and still using FIG. 1 for reference, when separation between the first side board (3) and the second side board (4) is required, the user is able to press the head (11) to force the central rod (13) to move downward relative to the top board. Because the first inclined face (131) is engaged with the second inclined face (251), the longitudinally downward movement of the central rod (13) drives the lateral rod (25) to move laterally. Again because the base (21) is securely connected to the moving plate (231), movement of the lateral rod (25) forces the moving plate (231) to move relative to the fixed plate (230), which compresses the spring (24) sandwiched between the moving plate (231) and the fixed plate (230). After the moving plate (230) is moved, the hook (2311) is also moved. Thus, the hook (2311) originally positioned in the first slit (31) of the firs side board (3) and the second slit (41) of the second side board (4) is released from the limitation of the first slit (41) due to the movement of the moving plate (230).

A different embodiment as shown in FIG. 1, shows that the securing device further has a facilitating device (5) securely formed on the inner side face of the first side board (3). The facilitating device has a mounting bracket (51) securely mounted on the inner side face of the first side board (3), a second spring (52) having a first end securely connected to a side face of the mounting bracket (51) and a second end securely engaged with a rod (53) extending out of the mounting bracket (51) to engage with an inner side face of the second side board (4). Therefore, when the second side board (4) is connected to the first side board (3), the rod (53) is forced by the inner side face of the second side board (4) to move toward the second spring (52). Thus the second spring (52) is compressed while the second side board (4) is connected to the first side board (3). When the second side board (4) is separated from the first side board (3) due to the lateral movement of the lateral rod (25), the rod (53), as a result of the release of the stored recovery force in the second spring (52), is pushed by the second spring (52) and thus separation between the second side board (4) and the first side board (3) is facilitated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A securing device for securing/separating a first side board and a second side board adjacent to the first side board of a computer main frame, the securing device comprising:

a driving press having a central rod extending from the driving press to be longitudinally movable mounted on a top board of the computer main frame; and a base adapted to be securely connected to an inner side face of the first side board and having a moving plate adapted to be firmly connected to the first side board, a moving plate pivotally connected to the fixed plate with a first spring sandwiched between the moving plate and the fixed plate and a lateral rod integrally formed with the base to extend through the moving plate to abut the first spring between the fixed plate and the moving plate and to engage with a free end of the central rod such that when the central rod is longitudinally moved, the longitudinal movement of the central rod drives the lateral rod to move laterally and thus a hook which is formed on a side face of the moving plate for extending through the first side board and the second side board to secure engagement between the first side board and the second side board is away from engagement with the second side board and thus the second side board is free from engagement with the first side board.

2. The securing device as claimed in claim 1, wherein the driving press further has two engaging arms formed on the driving press to sandwich the central rod and being adapted to prevent the central rod from escaping from the top board.

3. The securing device as claimed in claim 2, wherein the two engaging extensions are adapted to be firmly fixed to the inner side face of the first side board.

4. The securing device as claimed in claim 2, wherein the two engaging extensions are adapted to be pivotally connected to the inner side face of the first side board.

5. The securing device as claimed in claim 3, wherein the central rod has a first inclined face formed on a free end thereof and the lateral rod has a second inclined face formed on a free end thereof to be complementarily engage with the first inclined face of the central rod such that the longitudinal movement of the central rod is able to drive the lateral rod to move laterally.

6. The securing device as claimed in claim 4, wherein the central rod has a first inclined face formed on a free end thereof and the lateral rod has a second inclined face formed on a free end thereof to be selectively and complementarily engage with the first inclined face of the central rod such that the longitudinal movement of the central rod is able to drive the lateral rod to move laterally.

7. The securing device as claimed in claim 4 further has a mounting bracket securely formed on the inner face of the first side board, a second spring a first end of which is securely connected to the mounting bracket and a rod extending out of the mounting bracket and securely connected to a second end of the second spring for engagement with an inner side face of the second side board such that the rod is able to facilitate separation between the first side board and the second side board due to a release of a recovery force in the second spring.

8. The securing device as claimed in claim 5 further has a mounting bracket securely formed on the inner face of the first side board, a second spring a first end of which is securely connected to the mounting bracket and a rod extending out of the mounting bracket and securely connected to a second end of the second spring for engagement with an inner side face of the second side board such that the rod is able to facilitate separation between the first side board and the second side board due to a release of a recovery force in the second spring.

9. The securing device as claimed in claim 6 further has a mounting bracket securely formed on the inner face of the first side board, a second spring a first end of which is securely connected to the mounting bracket and a rod extending out of the mounting bracket and securely connected to a second end of the second spring for engagement with an inner side face of the second side board such that the rod is able to facilitate separation between the first side board and the second side board due to a release of a recovery force in the second spring.

10. The securing device as claimed in claim 7 further has a mounting bracket securely formed on the inner face of the first side board, a second spring a first end of which is securely connected to the mounting bracket and a rod extending out of the mounting bracket and securely connected to a second end of the second spring for engagement with an inner side face of the second side board such that the rod is able to facilitate separation between the first side board and the second side board due to a release of a recovery force in the second spring.

* * * * *